US010797949B2

(12) United States Patent
Rathi et al.

(10) Patent No.: US 10,797,949 B2
(45) Date of Patent: Oct. 6, 2020

(54) I/O RECOVERY FOR STORAGE SIDE CABLE MOVEMENT IN FABRIC-ASSIGNED WORLD-WIDE PORT NAME FABRICS

(71) Applicant: International Business Machines Corporation, Armonk, NY (US)

(72) Inventors: Sanket Rathi, Hyderabad (IN); Kiran K. Anumalasetty, Bangalore (IN); Rajaboina Yadagiri, Hyderabad (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/188,389

(22) Filed: Nov. 13, 2018

(65) Prior Publication Data

US 2020/0153689 A1 May 14, 2020

(51) Int. Cl.
G06F 15/16 (2006.01)
H04L 12/24 (2006.01)

(52) U.S. Cl.
CPC .......... *H04L 41/0816* (2013.01); *H04L 41/12* (2013.01)

(58) Field of Classification Search
CPC .................. H04L 41/0816; H04L 41/12
See application file for complete search history.

(56) References Cited

U.S. PATENT DOCUMENTS

| | | | | |
|---|---|---|---|---|
| 7,039,662 | B2 * | 5/2006 | Kano | G06F 3/0619 |
| 7,343,524 | B2 * | 3/2008 | Klotz | H04L 41/12 |
| | | | | 714/25 |
| 7,352,706 | B2 * | 4/2008 | Klotz | H04L 41/12 |
| | | | | 370/241 |
| 7,441,154 | B2 * | 10/2008 | Klotz | G06F 11/2257 |
| | | | | 714/39 |
| 8,028,062 | B1 | 9/2011 | Wigmore et al. | |
| 9,304,875 | B2 * | 4/2016 | Anumalasetty | G06F 11/2007 |
| 9,747,180 | B1 | 8/2017 | Fair | |
| 10,235,206 | B2 * | 3/2019 | Devendran | G06F 13/20 |
| 10,353,585 | B2 * | 7/2019 | Kolbush | G06F 3/0665 |

(Continued)

OTHER PUBLICATIONS

Brocade, *Fabric-Assigned PWWN, from, Brocade Fabric OS Administration Guide*, 7.4.0., Nov. 2016, pp. 475-480, Brocade Communications Systems, Inc. (online), URL: www.brocade.com/content/html/en/administration-guide/fos-741-adminguide/GUID-AA29F1DC-7C4C-4ADD-8655-8B54106098A6.html.

*Primary Examiner* — Moustafa M Meky
(74) *Attorney, Agent, or Firm* — Nathan M. Rau (57) ABSTRACT

I/O recovery for storage side cable movement in fabric-assigned WWPN fabrics including receiving a state change notification indicating a change to a first fabric-assigned world-wide port name (WWPN) on a fibre channel switch; pausing I/O activity for active logical unit numbers (LUNs) connected to the fibre channel switch via the first fabric-assigned WWPN; obtaining a list of potential fabric-assigned WWPNs; requesting, via the fibre channel switch, a reported list of LUNs from each fabric-assigned WWPN in the list of potential fabric-assigned WWPNs; comparing each reported list of LUNs to the paused active LUNs to determine a second fabric-assigned WWPN from the list of potential fabric-assigned WWPNs to which the paused active LUNs are connected; updating, with the second fabric-assigned WWPN, connection information for the paused active LUNs; and resuming I/O activity for the paused active LUNs using the updated connection information.

20 Claims, 6 Drawing Sheets

(56) References Cited

U.S. PATENT DOCUMENTS

| | | | |
|---|---|---|---|
| 2004/0054776 A1* | 3/2004 | Klotz | H04L 41/06 709/224 |
| 2005/0198451 A1* | 9/2005 | Kano | G06F 3/0619 711/162 |
| 2006/0075005 A1* | 4/2006 | Kano | G06F 3/0619 |
| 2009/0307378 A1 | 12/2009 | Allen et al. | |
| 2014/0157046 A1* | 6/2014 | Anumalasetty | G06F 11/2005 714/6.22 |
| 2014/0286194 A1 | 9/2014 | Subramanyan et al. | |
| 2017/0235494 A1* | 8/2017 | Kolbush | G06F 3/0607 710/313 |

* cited by examiner

ND WORLD-WIDE PORT NAME FABRICS

BACKGROUND

Field of the Invention

The field of the invention is data processing, or, more specifically, methods, apparatus, and products for I/O recovery for storage side cable movement in fabric-assigned world-wide port name (WWPN) fabrics.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for I/O recovery for storage side cable movement in fabric-assigned WWPN fabrics are disclosed in this specification. I/O recovery for storage side cable movement in fabric-assigned WWPN fabrics includes receiving a state change notification indicating a change to a first fabric-assigned world-wide port name (WWPN) on a fibre channel switch, wherein the state change notification is sent from the fibre channel switch in response to a removal of a cable attached to a port assigned the first fabric-assigned WWPN; pausing I/O activity for active logical unit numbers (LUNs) connected to the fibre channel switch via the first fabric-assigned WWPN; obtaining a list of potential fabric-assigned WWPNs, wherein the list of potential fabric-assigned WWPNs comprises WWPNs assigned to a port to which the disconnected LUNs may have been reconnected; requesting, via the fibre channel switch, a reported list of LUNs from each fabric-assigned WWPN in the list of potential fabric-assigned WWPNs; comparing each reported list of LUNs to the paused active LUNs to determine a second fabric-assigned WWPN from the list of potential fabric-assigned WWPNs to which the paused active LUNs are connected; updating, with the second fabric-assigned WWPN, connection information for the paused active LUNs; and resuming I/O activity for the paused active LUNs using the updated connection information.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
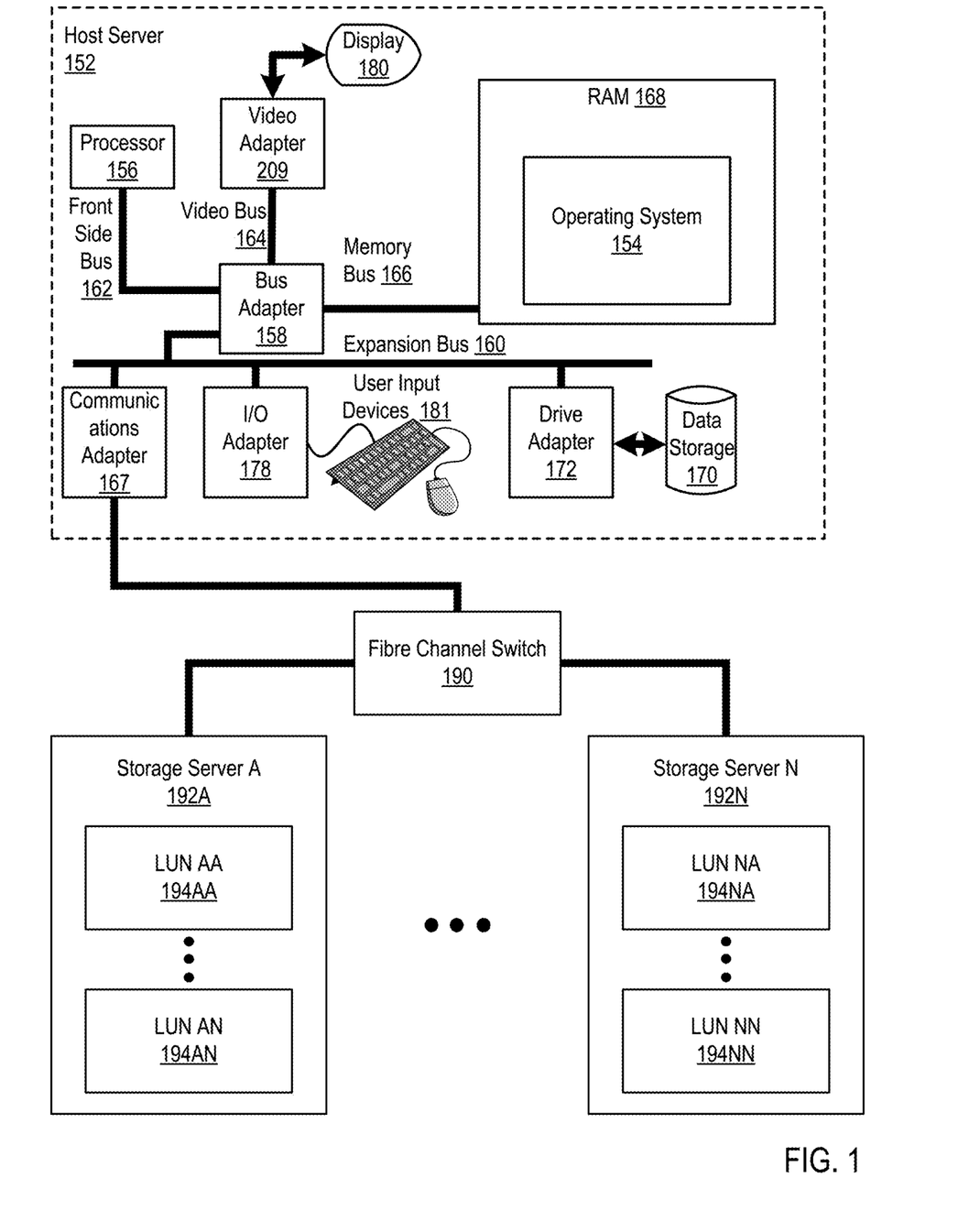
FIG. 1 sets forth a block diagram of an example system configured for I/O recovery for storage side cable movement in fabric-assigned world-wide port name (WWPN) fabrics according to embodiments of the present invention.

Exemplary methods, apparatus, and products for I/O recovery for storage side cable movement in fabric-assigned world-wide port name (WWPN) fabrics in accordance with the present invention are described with reference to the accompanying drawings, beginning with FIG. 1. FIG. 1 sets forth a block diagram of automated computing machinery comprising an exemplary host server (152) configured for I/O recovery for storage side cable movement in fabric-assigned WWPN fabrics according to embodiments of the present invention. The host server (152) of FIG. 1 includes at least one computer processor (156) or 'CPU' as well as random access memory (168) ('RAM') which is connected through a high speed memory bus (166) and bus adapter (158) to processor (156) and to other components of the host server (152).

Stored in RAM (168) is an operating system (154). Operating systems useful in computers configured for I/O recovery for storage side cable movement in fabric-assigned WWPN fabrics according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive.

The host server (152) of FIG. 1 includes disk drive adapter (172) coupled through expansion bus (160) and bus adapter (158) to processor (156) and other components of the host server (152). Disk drive adapter (172) connects non-volatile data storage to the host server (152) in the form of data storage (170). Non-volatile computer memory also may be implemented for as an optical disk drive, electrically erasable programmable read-only memory (so-called 'EEPROM' or 'Flash' memory), RAM drives, and so on, as will occur to those of skill in the art.

The example host server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example host server (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary host server (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for I/O recovery for storage side cable movement in fabric-assigned WWPN fabrics according to embodiments of the present invention include modems for wired dial-up communications, Ethernet (IEEE 802.3) adapters for wired data communications, 802.11 adapters for wireless data communications, and fibre channel adapters.

The communications adapter (167) is communicatively coupled to a fibre channel switch (190). The fibre channel switch (190) is a network switch capable of routing messages between the host server (152) and the storage servers (server A (192A), storage server N (192N)). The fibre channel switch (190) is compatible with a fibre channel protocol that allows the creation of a fibre channel fabric for a storage area network (SAN). The fibre channel switch (190) includes multiple physical fibre channel ports. The fibre channel switch (190) may also include a fabric controller, an aggregation of hardware and software configured to manage the fibre channel network. The fabric controller may be part of the fibre channel switch (190) or located outside of the fibre channel switch (190) elsewhere on the fibre network.

The fibre channel switch (190) is communicatively coupled (via fibre channel ports) to one or more storage servers (storage server A (192A), storage server N (192N)). Each storage server (storage server A (192A), storage server N (192N)) is a storage device configured to provide access to logical storage units. Each storage server (server A (192A), storage server N (192N)) includes a number of logical storage units identified by a logical unit number (LUN) (LUN AA (194AA), LUN AN (194AN), LUN NA (194NA), LUN NN (194NN)). Each LUN (LUN AA (194AA), LUN AN (194AN), LUN NA (194NA), LUN NN (194NN)) is a unique identifier for one or more physical or virtual storage devices on the storage servers (storage server A (192A), storage server N (192N)).

The host server (152) accesses each LUN (LUN AA (194AA), LUN AN (194AN), LUN NA (194NA), LUN NN (194NN)) via connection information for each LUN. The connection information may include a world-wide port name (WWPN). In some modern SANs, instead of the host server having the WWPNs hardwired or assigning the WWPNs to ports connected to ports on the fibre channel switch (190), the fibre channel switch (190) or fabric controller may dynamically assign WWPNs to remote ports as storage devices are attached to the ports on the fibre channel switch (190). Such fabric-assigned WWPNs (also referred to as virtual WWPNs) may simplify storage server deployment in the fibre channel SAN environment. For example, services such as zoning and LUN masking may be performed before a server is attached to the SAN.

However, if a storage device is disconnected from a port and reconnected to a different port on the fibre channel switch (190), the fibre channel switch (190) or fabric controller may assign a different WWPN to the port on the storage device. Subsequently, input/output (I/O) instructions from the host server (152) to the LUNs on the storage device will fail because the connection information used by the host server (152) to access the LUNs includes an incorrect WWPN.

The connection information may also include a world-wide node name (WWNN). The WWNN is a unique identifier of the storage server (storage server A (192A), storage server N (192N)). The WWNN may be provided by the storage server (storage server A (192A), storage server N (192N)) to the host server (152) in response to a login request sent by the host server (152). A disconnect and reconnect of a storage server (storage server A (192A), storage server N (192N)) does not cause a change to the WWNN of the storage server.

Figure 2:
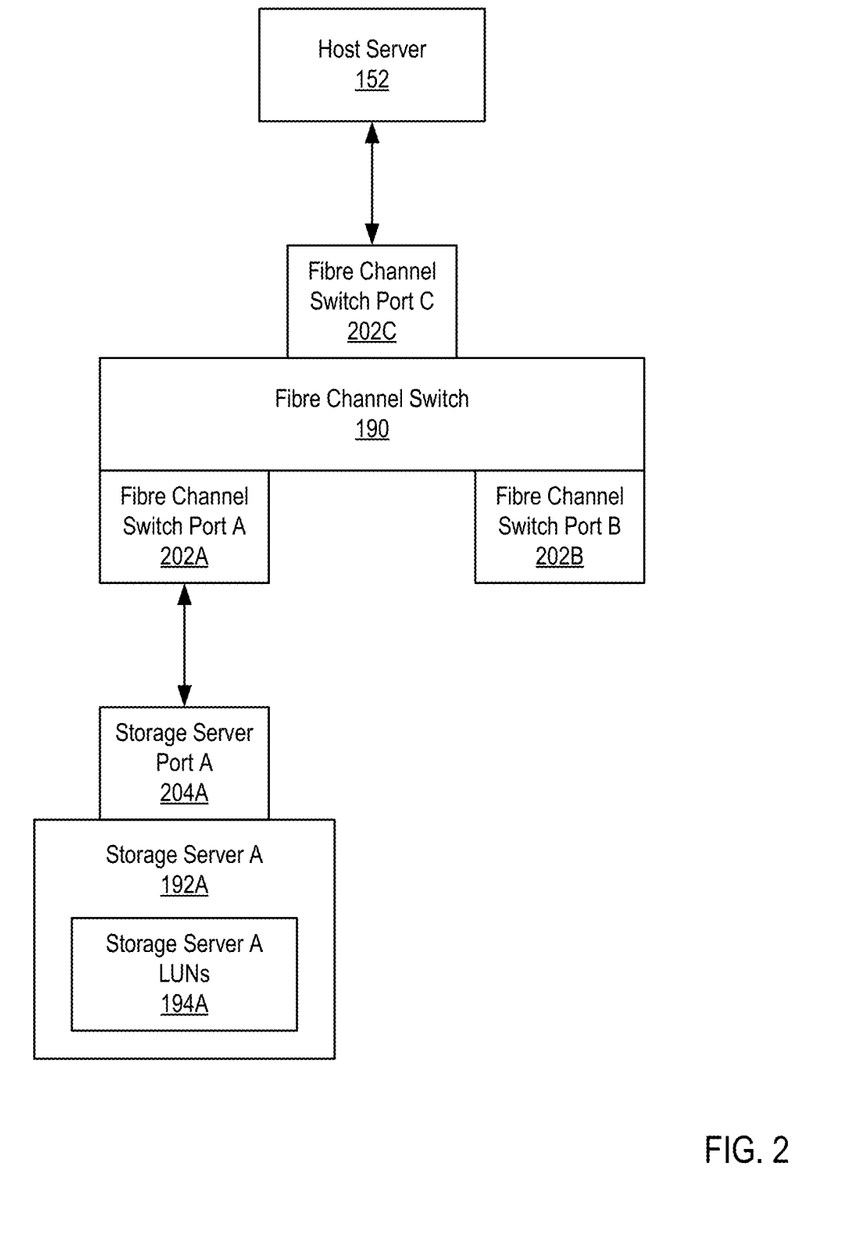
FIG. 2 sets forth a block diagram of an example system configured for I/O recovery for storage side cable movement in fabric-assigned WWPN fabrics according to embodiments of the present invention.
Figure 3:
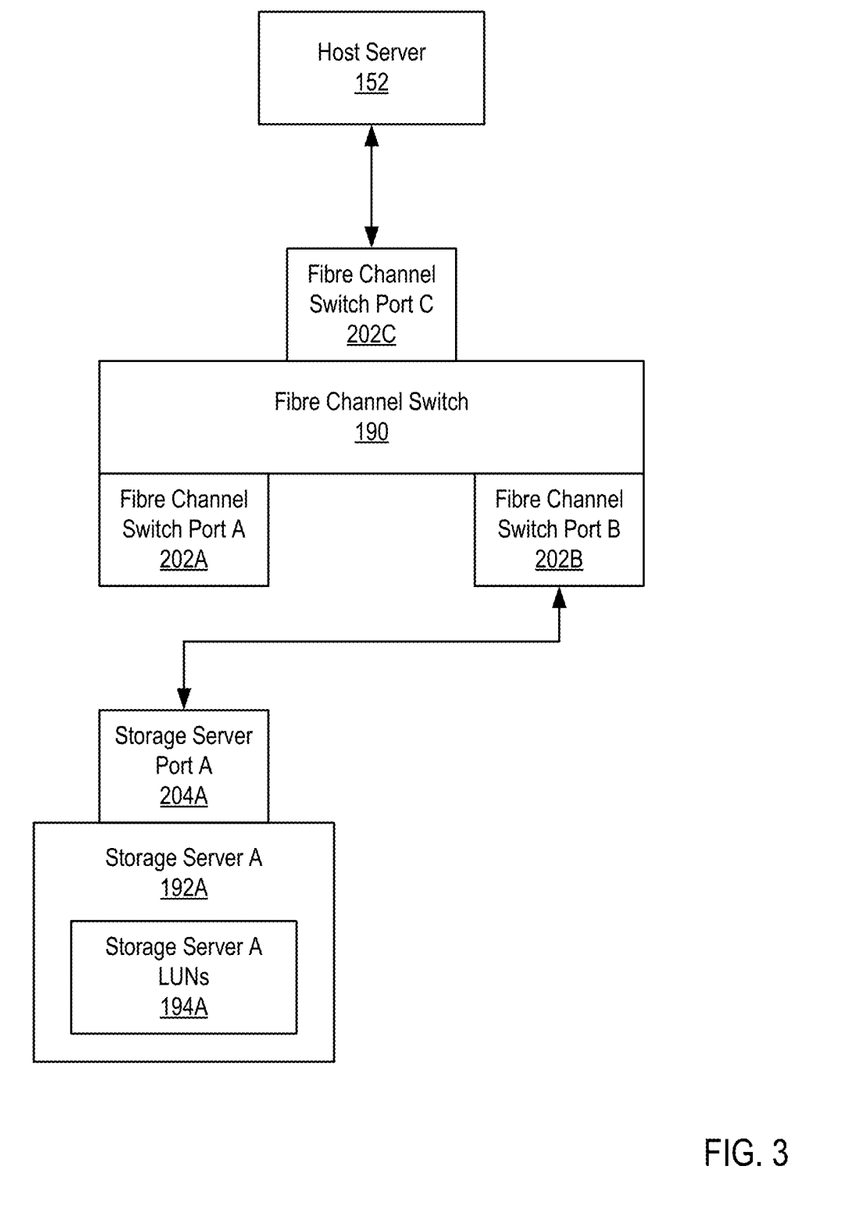
FIG. 3 sets forth a block diagram of an example system configured for I/O recovery for storage side cable movement in fabric-assigned WWPN fabrics according to embodiments of the present invention.

FIG. 2 and FIG. 3 show an exemplary system for I/O recovery for storage side cable movement in fabric-assigned WWPN fabrics according to embodiments of the present invention. As shown in FIG. 2 and FIG. 3, the exemplary system includes a host server (152) communicatively coupled to a fibre channel switch (190) via fibre channel switch port C (202C). Also communicatively coupled to the fibre channel switch (190) is storage server A (192A) that includes storage server A LUNs (194A) and is coupled to the fibre channel switch (190) via fibre channel switch port A (202A) and storage server port A (204A). In FIG. 3, storage server A (192A) has been disconnected from fibre channel switch port A (202A) and reconnected to the fibre channel switch (190) via fibre channel switch port B (202B).

In FIG. 2, once storage server A (192A) is connected to fibre channel switch port A (202A), storage server port A (204A) may be assigned a first WWPN by the fibre channel switch (190). The host server (152) then uses the first WWPN in the connection information for storage server A LUNs (194A) on storage server A (192A) to perform I/O operations on the storage server A LUNs (194A). However, if storage server A (192A) is disconnected from fibre channel switch port A (202A) and reconnected to fibre channel switch port B (202B) as shown in FIG. 3, then the fibre channel switch (190) or fabric controller assigns a second (different) WWPN to storage server port A (204A). If the host server (152) attempts to perform an I/O operation using the connection information for storage server A LUNs (194A) that includes the first WWPN, those I/O operations will fail.

Figure 4:
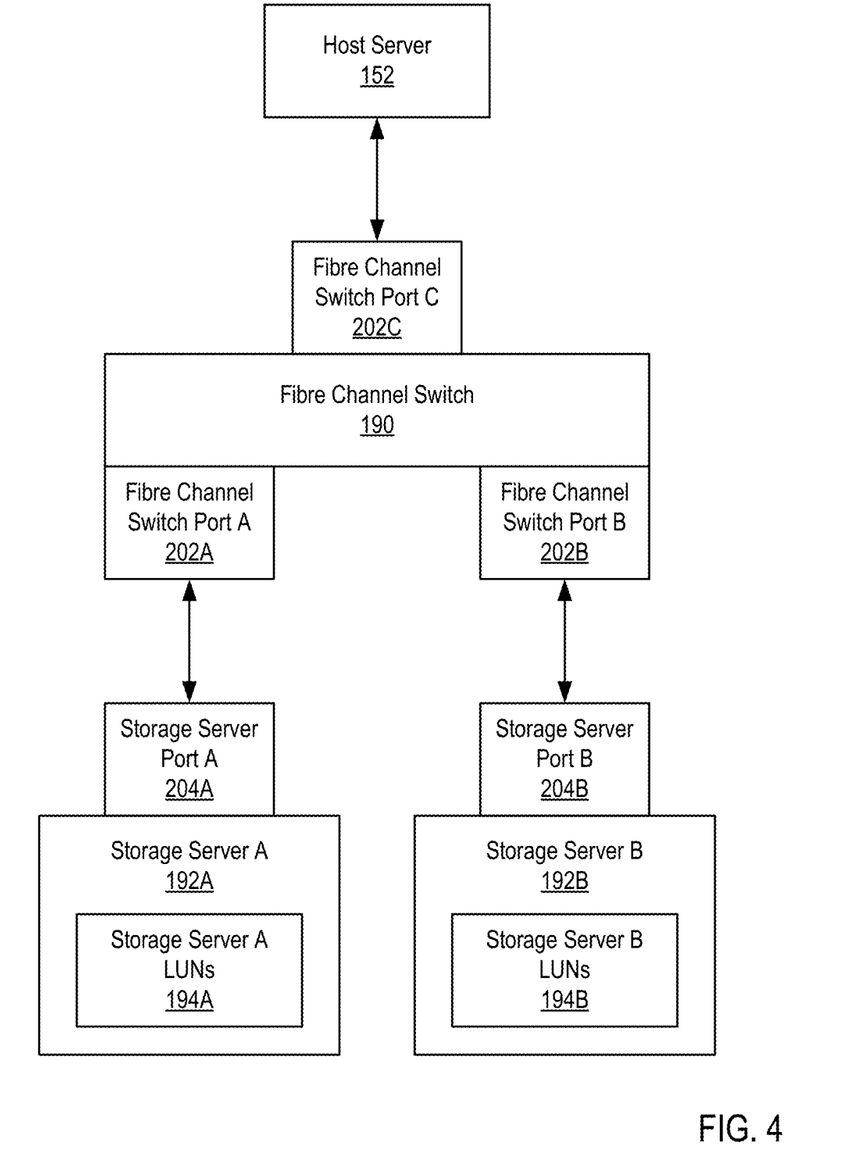
FIG. 4 sets forth a block diagram of an example system configured for I/O recovery for storage side cable movement in fabric-assigned WWPN fabrics according to embodiments of the present invention.
Figure 5:
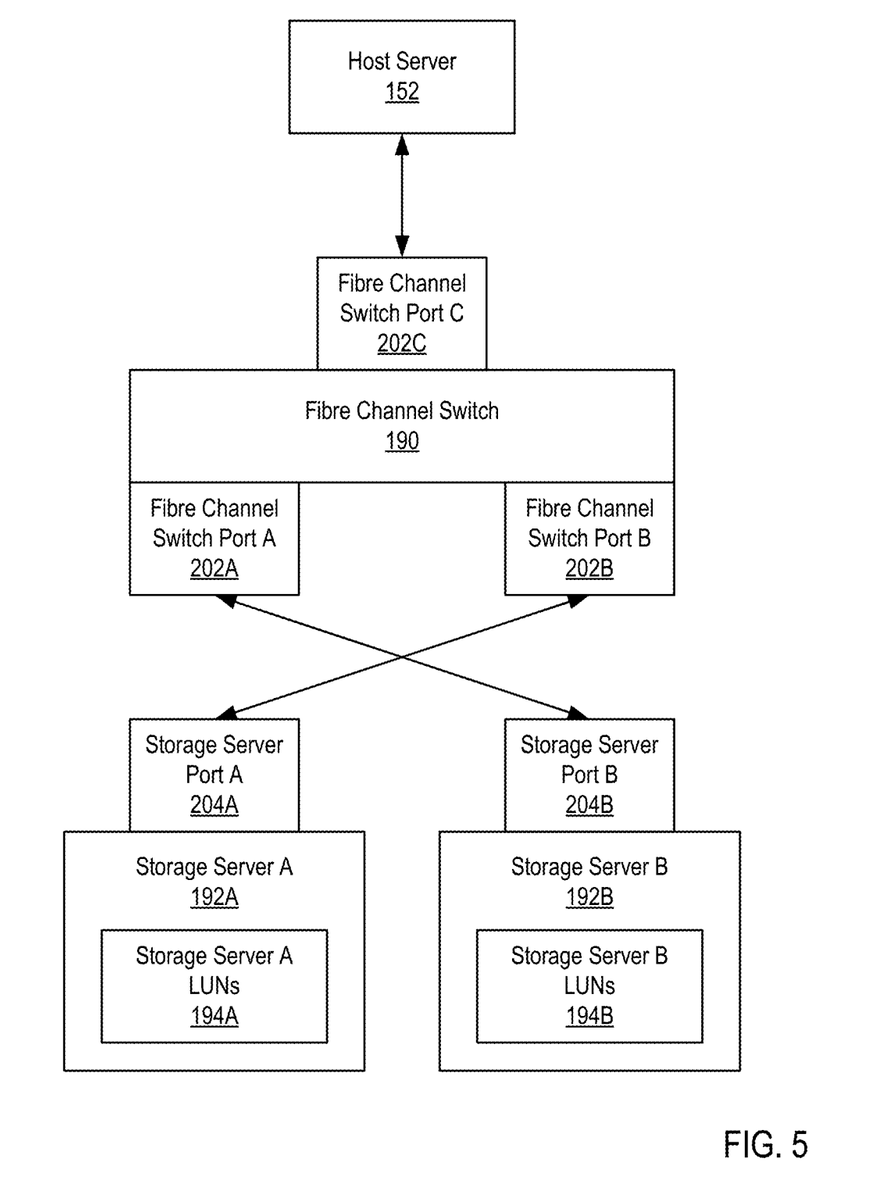
FIG. 5 sets forth a block diagram of an example system configured for I/O recovery for storage side cable movement in fabric-assigned WWPN fabrics according to embodiments of the present invention.

FIG. 4 and FIG. 5 show an exemplary system for I/O recovery for storage side cable movement in fabric-assigned WWPN fabrics according to embodiments of the present invention. As shown in FIG. 4 and FIG. 5, the exemplary system includes a host server (152) communicatively coupled to a fibre channel switch (190) via fibre channel switch port C (202C). Also communicatively coupled to the fibre channel switch (190) is storage server A (192A) that includes storage server A LUNs (194A) and storage server B (192B) that includes storage server B LUNs (194B). In FIG. 4, storage server A (192A) is communicatively coupled to the fibre channel switch (190) via fibre channel switch port A (202A) and storage server port A (204A), and storage server B (192B) is communicatively coupled to the fibre channel switch (190) via fibre channel switch port B (202B) and storage server port B (204B). In FIG. 5, storage server A (192A) has been disconnected from fibre channel switch port A (202A) and reconnected to the fibre channel switch (190) via fibre channel switch port B (202B), and storage server B (192B) has been disconnected from fibre channel switch port B (202B) and reconnected to the fibre channel switch (190) via fibre channel switch port A (202A).

In FIG. 4, once storage server A (192A) is connected to fibre channel switch port A (202A), storage server port A (204A) may be assigned a first WWPN by the fibre channel switch (190). Similarly, once storage server B (192B) is connected to fibre channel switch port B (202B), storage server port B (204B) may be assigned a second WWPN by the fibre channel switch (190). The host server (152) then uses the first WWPN in the connection information for storage server A LUNs (194A) on storage server A (192A) to perform I/O operations on the storage server A LUNs (194A). The host server (152) also uses the second WWPN in the connection information for storage server B LUNs (194B) on storage server B (192B) to perform I/O operations on the storage server B LUNs (194B).

However, as shown in FIG. 5, if storage server A (192A) is disconnected from fibre channel switch port A (202A) and reconnected to fibre channel switch port B (202B), and if storage server B (192B) is disconnected from fibre channel switch port B (202B) and reconnected to fibre channel switch port A (202A), then the fibre channel switch (190) or fabric controller assigns the first WWPN to storage server port A (204A) and assigns the second WWPN to storage server port B (204B). If the host server (152) attempts to perform an I/O operation using the connection information for storage server A LUNs (194A) that includes the first WWPN, those I/O operations will fail. Similarly, if the host server (152) attempts to perform an I/O operation using the connection information for storage server B LUNs (194B) that includes the second WWPN, those I/O operations will also fail.

Figure 6:
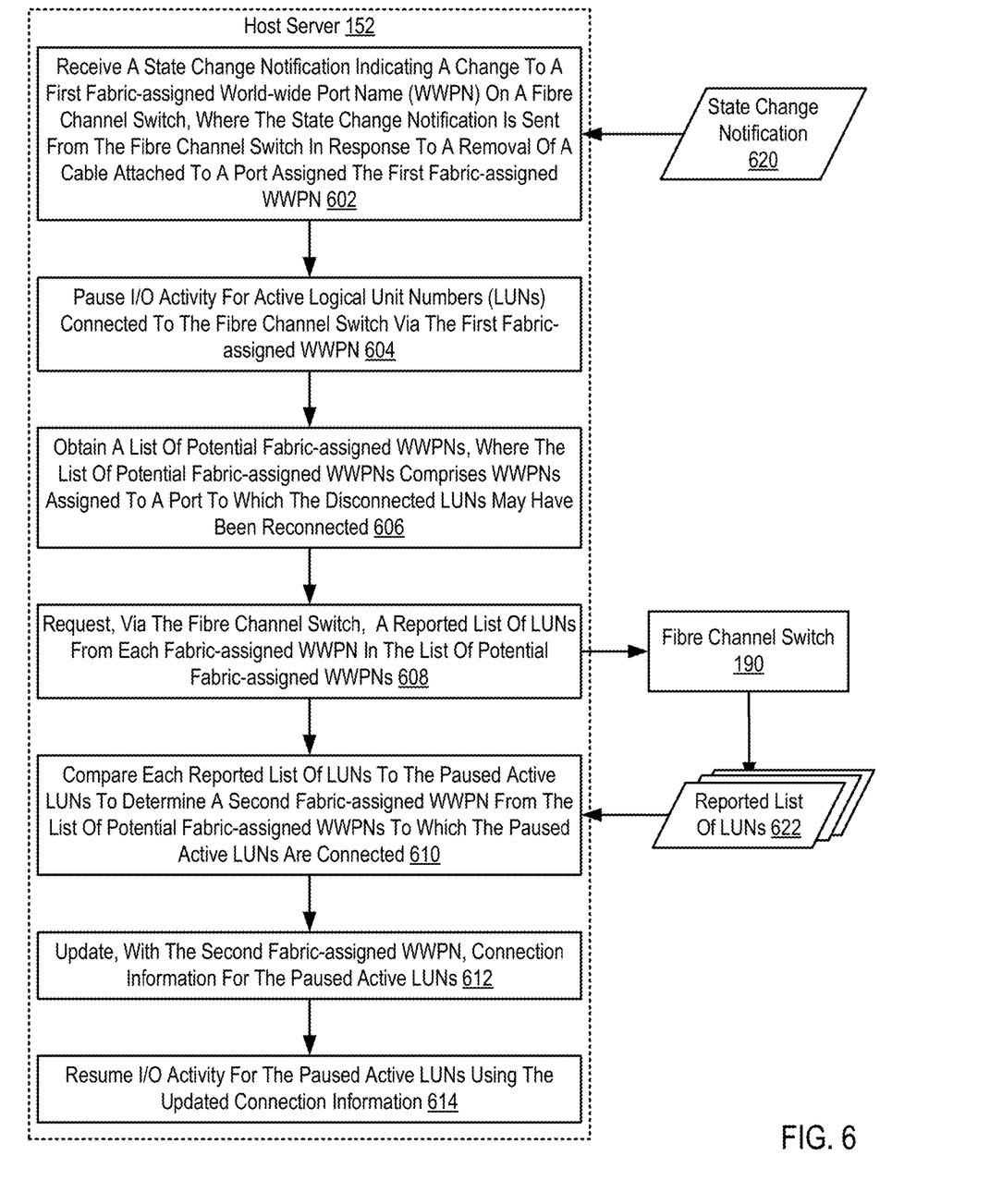
FIG. 6 sets forth a flow chart illustrating an exemplary method for I/O recovery for storage side cable movement in fabric-assigned WWPN fabrics according to embodiments of the present invention.

For further explanation, FIG. 6 sets forth a flow chart illustrating an exemplary method for I/O recovery for storage side cable movement in fabric-assigned WWPN fabrics according to embodiments of the present invention that includes receiving (602) a state change notification (620) indicating a change to a first fabric-assigned WWPN on a fibre channel switch (190), wherein the state change notification (620) is sent from the fibre channel switch (190) in response to a removal of a cable attached to a port assigned the first fabric-assigned WWPN. Receiving (602) a state change notification (620) indicating a change to a first fabric-assigned WWPN on a fibre channel switch (190), wherein the state change notification (620) is sent from the fibre channel switch (190) in response to a removal of a cable attached to a port assigned the first fabric-assigned WWPN may be carried out by the host server (152) or host server fibre channel adapter receiving the state change notification (620) from the fibre channel switch (190) or fabric controller. The state change notification (620) indicates that a cable attached to a port that has been assigned the first WWPN has been disconnected. The state change notification (620) may include each WWPN for which a cable has been disconnected.

The method of FIG. 6 further includes pausing (604) I/O activity for active logical unit numbers (LUNs) connected to the fibre channel switch (190) via the first fabric-assigned WWPN. Pausing (604) I/O activity for active logical unit numbers (LUNs) connected to the fibre channel switch (190) via the first fabric-assigned WWPN may be carried out by the host server (152) or host server fibre channel adapter in response to receiving the state change notification (620). Pausing (604) the I/O activity for the active LUNs may include ceasing sending I/O instructions from the host server (152) without canceling the I/O operations. The I/O operations may be put in a wait state to avoid a failure of the I/O operations.

The method of FIG. 6 further includes obtaining (606) a list of potential fabric-assigned WWPNs, wherein the list of potential fabric-assigned WWPNs comprises WWPNs assigned to a port to which the disconnected LUNs may have been reconnected. Obtaining (606) a list of potential fabric-assigned WWPNs, wherein the list of potential fabric-assigned WWPNs comprises WWPNs assigned to a port to which the disconnected LUNs may have been reconnected may be carried out by the host server (152) or host server fibre channel adapter sending a discovery command to the fibre channel switch (190) or fabric controller targeting the WWPNs received in the state change notification (620).

If the WWPNs received in the state change notification (620) have not rejoined the fibre channel switch (190) (i.e., the same WWPN has not been assigned to a port on device currently connected to the fibre channel switch (190)), then the fibre channel switch (190) or fabric controller will respond to the discovery command with an indication that the WWPNs have not rejoined the fibre channel switch (190). This situation is depicted in FIG. 2 and FIG. 3.

If the WWPNs received in the state change notification (620) have rejoined the fibre channel switch (190) (i.e., the same WWPN has been assigned to a port on device currently connected to the fibre channel switch (190)), then the fibre channel switch (190) or fabric controller will respond to the discovery command with an indication that the WWPNs have rejoined the fibre channel switch (190). This situation is depicted in FIG. 4 and FIG. 5. Based on the indication received in response to the discovery command, the host server (152) or host server fibre channel adapter generates the list of potential fabric-assigned WWPNs.

The method of FIG. 6 further includes requesting (608), via the fibre channel switch, a reported list of LUNs (622) from each fabric-assigned WWPN in the list of potential fabric-assigned WWPNs. Requesting (608), via the fibre channel switch, a reported list of LUNs (622) from each fabric-assigned WWPN in the list of potential fabric-assigned WWPNs may be carried out by the host server (152) or host server fibre channel adapter issuing a report LUNs command targeting the fabric-assigned WWPNs in the list of potential fabric-assigned WWPNs.

The method of FIG. 6 further includes comparing (610) each reported list of LUNs (622) to the paused active LUNs to determine a second fabric-assigned WWPN from the list of potential fabric-assigned WWPNs to which the paused active LUNs are connected. Comparing (610) each reported list of LUNs (622) to the paused active LUNs to determine a second fabric-assigned WWPN from the list of potential fabric-assigned WWPNs to which the paused active LUNs are connected may be carried out by the host server (152) or host server fibre channel adapter matching a LUN from one of the reported lists of LUNs to a LUN from the paused active LUNs; and determining that the matched LUN from one of the reported lists of LUNs is connected to the fibre channel switch via the second WWPN. Matching a LUN from one of the reported lists of LUNs to a LUN from the paused active LUNs may be carried out by searching for a match between the reported list of LUNs (622) with known fabric-assigned WWPNs to the connection information for each paused active LUN. Matching may be performed using the LUNs or a serial number of the LUNs. By matching a LUN from the reported list of LUNs (622) to a paused active LUN, the matched paused active LUN may be accessed using the fabric-assigned WWPN from the LUN in the reported list of LUNs (622).

The method of FIG. 6 further includes updating (612), with the second fabric-assigned WWPN, connection information for the paused active LUNs. Updating (612), with the second fabric-assigned WWPN, connection information for the paused active LUNs may be carried out by the host server (152) or host server fibre channel adapter altering the connection information for each paused active LUN with the fabric-assigned WWPN determined from the reported list of LUNs (622).

The method of FIG. 6 further includes resuming (614) I/O activity for the paused active LUNs using the updated connection information. Resuming (614) I/O activity for the paused active LUNs using the updated connection information may be carried out by the host server (152) or host server fibre channel adapter restarting I/O operations by sending I/O instructions to the previously paused active LUNs using the connection information updated with the current fabric-assigned WWPNs for the target LUNs.

The steps of the method of FIG. 6 may be performed differently depending upon the response from the discovery command. The response to the discovery command indicates whether the targeted fabric-assigned WWPN is currently assigned to a storage server. If the response indicates that no storage server is currently connected with the targeted fabric-assigned WWPN, then a first storage server may have been unplugged from a port without being replaced by a second storage server to the same port (as in FIG. 2 and FIG. 3). If the response indicates that a storage server is currently connected with the targeted fabric-assigned WWPN, then the first storage server may have been unplugged from a port and replaced by a second storage server to the same port (as in FIG. 4 and FIG. 5).

For the situation depicted in FIG. 2 and FIG. 3, obtaining (606) the list of potential fabric-assigned WWPNs may include receiving an indication that the first fabric-assigned WWPN has not rejoined the fibre channel switch in response to sending a discovery command to the fibre channel switch; obtaining a list of currently connected fabric-assigned WWPNs from the fibre channel switch; and generating the list of potential fabric-assigned WWPNs by filtering the list of currently connected fabric-assigned WWPNs based on WWPNs newly added to the fibre channel switch.

Receiving an indication that the first fabric-assigned WWPN has not rejoined the fibre channel switch in response to sending a discovery command to the fibre channel switch may be carried out by the host server (152) or host server fibre channel adapter generating the discovery command and sending the discovery command to the fibre channel switch or fabric controller. The indication that the first fabric-assigned WWPN has not rejoined the fibre channel switch may mean that the storage server has been disconnected, and if reconnected, has been assigned a different WWPN.

Obtaining a list of currently connected fabric-assigned WWPNs from the fibre channel switch may be carried out by the host server (152) or host server fibre channel adapter sending a command to the fibre channel switch or fabric controller to query the list of target ports currently connected to the fibre channel switch. The fibre channel switch or fabric controller responds with a list of the WWPNs currently connected to the fibre channel switch.

Generating the list of potential fabric-assigned WWPNs by filtering the list of currently connected fabric-assigned WWPNs based on WWPNs newly added to the fibre channel switch may be carried out by the host server (152) or host server fibre channel adapter removing WWPNs from the list of currently connected fabric-assigned WWPNs that are have not been newly added to the fibre channel switch. The host server (152) or host server fibre channel adapter may use a threshold connection age to filter the list of currently connected fabric-assigned WWPNs such that WWPNs that were assigned longer ago than the threshold age are removed from the list. The list of potential fabric-assigned WWPNs therefore contains only those WWPNs newly added to the fibre channel switch.

For the situation depicted in FIG. 4 and FIG. 5, the state change notification may further indicate a change to a third fabric-assigned WWPN on the fibre channel switch. Specifically, the state change notification may include an indication that both the first fabric-assigned WWPN and a third fabric-assigned WWPN have been disconnected.

Also for the situation depicted in FIG. 4 and FIG. 5, pausing (604) I/O activity for the active LUNs connected to the fibre channel switch (190) via the first fabric-assigned WWPN may include pausing I/O activity for active LUNs connected to the fibre channel switch via the third fabric-assigned WWPN. Pausing I/O activity for active LUNs connected to the fibre channel switch via the third fabric-assigned WWPN may be carried out by the host server (152) or host server fibre channel adapter ceasing sending I/O instructions that target the first fabric-assigned WWPN and the third fabric-assigned WWPN from the host server (152) without canceling the I/O operations. The I/O operations may be put in a wait state to avoid a failure of the I/O operations.

Also for the situation depicted in FIG. 4 and FIG. 5, obtaining (606) the list of potential fabric-assigned WWPNs may include receiving an indication that the first fabric-assigned WWPN and the third fabric-assigned WWPN have rejoined the fibre channel switch in response to sending a discovery command to the fibre channel switch; and generating the list of potential fabric-assigned WWPNs using the first fabric-assigned WWPN and the third fabric-assigned WWPN.

Receiving an indication that the first fabric-assigned WWPN and the third fabric-assigned WWPN have rejoined the fibre channel switch in response to sending a discovery command to the fibre channel switch may be carried out by the host server (152) or host server fibre channel adapter generating the discovery command and sending the discovery command to the fibre channel switch or fabric controller. The indication that the first fabric-assigned WWPN and the third fabric-assigned WWPN have rejoined the fibre channel switch may mean that storage servers have connected and assigned the first fabric-assigned WWPN and the third fabric-assigned WWPN. However, the same storage servers may not have been assigned the same WWPN as were assigned before disconnection (i.e., the WWPN may have been switched).

Generating the list of potential fabric-assigned WWPNs using the first fabric-assigned WWPN and the third fabric-assigned WWPN may be carried out by the host server (152) or host server fibre channel adapter using the first fabric-assigned WWPN and the third fabric-assigned WWPN as potential WWPNs for the active paused LUNs.

Also for the situation depicted in FIG. 4 and FIG. 5, requesting (608) the reported list of LUNs from each fabric-assigned WWPN in the list of potential fabric-assigned WWPNs may include retrieving, via the fibre channel switch, a world-wide node name (WWNN) for the first fabric-assigned WWPN and the third fabric-assigned WWPN; determining that the retrieved WWNNs for the first fabric-assigned WWPN and the third fabric-assigned WWPN do not match connection information for the first fabric-assigned WWPN and the third fabric-assigned WWPN; and in response to determining that the retrieved WWNNs for the first fabric-assigned WWPN and the third fabric-assigned WWPN do not match connection information for the first fabric-assigned WWPN and the third fabric-assigned WWPN, requesting the reported list of LUNs from the first fabric-assigned WWPN and the third fabric-assigned WWPN.

Retrieving, via the fibre channel switch, a WWNN for the first fabric-assigned WWPN and the third fabric-assigned WWPN may be carried out by the host server (152) or host server fibre channel adapter sending a login request to the first fabric-assigned WWPN and the third fabric-assigned WWPN. In response, the storage servers provide WWNN to the host server (152) or host server fibre channel adapter. The WWNN is unique to the storage server and remains the same after disconnect and reconnect.

Determining that the retrieved WWNNs for the first fabric-assigned WWPN and the third fabric-assigned WWPN do not match connection information for the first fabric-assigned WWPN and the third fabric-assigned WWPN may be carried out by the host server (152) or host server fibre channel adapter comparing the WWNNs to the connection information for each active paused LUN.

Requesting the reported list of LUNs from the first fabric-assigned WWPN and the third fabric-assigned WWPN may be carried out by the host server (152) or host server fibre channel adapter issuing a report LUNs command targeting the first fabric-assigned WWPN and the third fabric-assigned WWPN.

Also for the situation depicted in FIG. 4 and FIG. 5, comparing (610) each reported list of LUNs to the paused active LUNs to determine the second fabric-assigned WWPN from the list of potential fabric-assigned WWPNs to which the paused active LUNs are connected may include filtering the paused active LUNs using the retrieved WWNNs for the first fabric-assigned WWPN and the third fabric-assigned WWPN; matching at least one LUN from the filtered paused active LUNs to at least one LUN from one of the reported lists of LUNs; and determining, based on the matched active LUNs, the second fabric-assigned WWPN and a fourth fabric-assigned WWPN to which the paused active LUNs are connected.

Filtering the paused active LUNs using the retrieved WWNNs for the first fabric-assigned WWPN and the third fabric-assigned WWPN may be carried out by the host server (152) or host server fibre channel adapter determining which paused active LUNs have connection information that includes the retrieved WWNNs for the first fabric-assigned WWPN and the third fabric-assigned WWPN. The filtered list of paused active LUNs may include only those LUNs with connection information that includes the retrieved WWNNs for the first fabric-assigned WWPN and the third fabric-assigned WWPN.

Matching at least one LUN from the filtered paused active LUNs to at least one LUN from one of the reported lists of LUNs may be carried out by the host server (152) or host server fibre channel adapter comparing the filtered list of paused active LUNs to the reported list of LUNs received from the fibre channel switch or fabric controller. The matched active LUNs are the paused active LUNs that have WWNNs that match the WWNNs for the LUNs from the reported list of LUNs. Matching at least one LUN from the filtered paused active LUNs to at least one LUN from one of the reported lists of LUNs may also be carried out by matching each reported LUNs with the list of LUNs for the port previously stored by the host server (152). A storage device may provide a subset of LUNs from a port and that port may join the fabric after the removal of the cable attached to the port assigned to the first fabric-assigned WWPN.

Determining, based on the matched active LUNs, the second fabric-assigned WWPN and a fourth fabric-assigned WWPN to which the paused active LUNs are connected may be carried out by the host server (152) or host server fibre channel adapter determining that the second fabric-assigned WWPN and the fourth fabric-assigned WWPN are the current fabric-assigned WWPNs for the paused active LUNs. Specifically, the determination is that the second fabric-assigned WWPN is the WWPN for a first subset of the paused active LUNs, and that the fourth fabric-assigned WWPN is the WWPN for a second subset of the paused active LUNs. The fourth fabric-assigned WWPN may be the same as the first fabric-assigned WWPN, and the second fabric-assigned WWPN may be the same as the third fabric-assigned WWPN.

Finally, for the situation depicted in FIG. 4 and FIG. 5, updating (612), with the second fabric-assigned WWPN, the connection information for the paused active LUNs may include updating, with the fourth fabric-assigned WWPN, the connection information for the paused active LUNs. Updating, with the fourth fabric-assigned WWPN, the connection information for the paused active LUNs may be carried out by the host server (152) or host server fibre channel adapter altering the connection information for a first subset of the paused active LUN with the second fabric-assigned WWPN and altering the connection information for a second subset of the paused active LUN with the fourth fabric-assigned WWPN.

In view of the explanations set forth above, readers will recognize that the benefits of I/O recovery for storage side cable movement in fabric-assigned WWPN fabrics according to embodiments of the present invention include:

Improving the operation of a computing system by providing seamless I/O recovery when storage-side cable is moved from one port on a fibre channel switch to another, increasing computing system integrity and stability.

Improving the operation of a computing system by avoiding data integrity problems when storage-side cables are swapped between two storage servers on the fibre channel switch, increasing computing system integrity and stability.

Improving the operation of a computing system by providing seamless I/O recovery when storage-side cables coming from two storage servers are swapped on the fibre channel switch, increasing computing system integrity and stability.

Exemplary embodiments of the present invention are described largely in the context of a fully functional computer system for I/O recovery for storage side cable movement in fabric-assigned WWPN fabrics. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of I/O recovery for storage side cable movement in fabric-assigned world-wide port name (WWPN) fabrics, the method comprising:
receiving an indication that active logical unit numbers (LUNs) have been disconnected from a fibre channel switch port assigned with a first fabric-assigned WWPN;
pausing I/O activity for the active LUNs;
identifying a second fabric-assigned WWPN assigned to a port to which the disconnected LUNs are potentially reconnected;
determining that the paused active LUNs are connected to the second fabric-assigned WWPN;
updating, with the second fabric-assigned WWPN, connection information for the paused active LUNs; and
resuming I/O activity for the paused active LUNs using the updated connection information.

2. The method of claim 1, wherein identifying a second fabric-assigned WWPN assigned to a port to which the disconnected LUNs are potentially reconnected comprises:
receiving a second indication that the first fabric-assigned WWPN has not rejoined the fibre channel switch in response to sending a discovery command to the fibre channel switch;
obtaining a list of currently connected fabric-assigned WWPNs from the fibre channel switch; and
generating a list of potential fabric-assigned WWPNs by filtering the list of currently connected fabric-assigned WWPNs based on WWPNs newly added to the fibre channel switch.

3. The method of claim 1,
wherein the received indication further indicates a change to a third fabric-assigned WWPN on the fibre channel switch,
wherein pausing I/O activity for the active LUNs comprises pausing I/O activity for active LUNs connected to the fibre channel switch via the third fabric-assigned WWPN, and
wherein identifying a second fabric-assigned WWPN assigned to a port to which the disconnected LUNs are potentially reconnected comprises:
receiving a second indication that the first fabric-assigned WWPN and the third fabric-assigned WWPN have rejoined the fibre channel switch in response to sending a discovery command to the fibre channel switch;
generating a list of potential fabric-assigned WWPNs using the first fabric-assigned WWPN and the third fabric-assigned WWPN.

4. The method of claim 3, wherein determining that the paused active LUNs are connected to the second fabric-assigned WWPN comprises:
retrieving, via the fibre channel switch, a world-wide node name (WWNN) for the first fabric-assigned WWPN and the third fabric-assigned WWPN;
determining that the retrieved WWNNs for the first fabric-assigned WWPN and the third fabric-assigned WWPN do not match connection information for the first fabric-assigned WWPN and the third fabric-assigned WWPN; and
in response to determining that the retrieved WWNNs for the first fabric-assigned WWPN and the third fabric-assigned WWPN do not match connection information for the first fabric-assigned WWPN and the third fabric-assigned WWPN, requesting a reported list of LUNs from the first fabric-assigned WWPN and the third fabric-assigned WWPN.

5. The method of claim 4, wherein determining that the paused active LUNs are connected to the second fabric-assigned WWPN further comprises:
filtering the paused active LUNs using the retrieved WWNNs for the first fabric-assigned WWPN and the third fabric-assigned WWPN;
matching at least one LUN from the filtered paused active LUNs to at least one LUN from one of the reported lists of LUNs; and
determining, based on the matched active LUNs, the second fabric-assigned WWPN and a fourth fabric-assigned WWPN to which the paused active LUNs are connected.

6. The method of claim 5, wherein updating, with the second fabric-assigned WWPN, the connection information for the paused active LUNs comprises updating, with the fourth fabric-assigned WWPN, the connection information for the paused active LUNs.

7. The method of claim 1, wherein determining that the paused active LUNs are connected to the second fabric-assigned WWPN comprises:
matching a LUN from a reported list of LUNs obtained via the fibre channel switch to a LUN from the paused active LUNs; and
determining that the matched LUN from the reported list of LUNs is connected to the fibre channel switch via the second WWPN.

8. An apparatus for I/O recovery for storage side cable movement in fabric-assigned world-wide port name (WWPN) fabrics, the apparatus comprising a computer processor, a computer memory operatively coupled to the computer processor, the computer memory having disposed within it computer program instructions that, when executed by the computer processor, cause the apparatus to carry out the steps of:
receiving an indication that active logical unit numbers (LUNs) have been disconnected from a fibre channel switch port assigned with a first fabric-assigned WWPN.
pausing I/O activity for active LUNs;
identifying a second fabric-assigned WWPN assigned to a port to which the disconnected LUNs are potentially reconnected;
determining that the paused active LUNs are connected to the second fabric-assigned WWPN;
updating, with the second fabric-assigned WWPN, connection information for the paused active LUNs; and
resuming I/O activity for the paused active LUNs using the updated connection information.

9. The apparatus of claim 8, wherein identifying a second fabric-assigned WWPN assigned to a port to which the disconnected LUNs are potentially reconnected comprises:

receiving a second indication that the first fabric-assigned WWPN has not rejoined the fibre channel switch in response to sending a discovery command to the fibre channel switch;

obtaining a list of currently connected fabric-assigned WWPNs from the fibre channel switch; and generating a list of potential fabric-assigned WWPNs by filtering the list of currently connected fabric-assigned WWPNs based on WWPNs newly added to the fibre channel switch.

10. The apparatus of claim 8, wherein the received indication further indicates a change to a third fabric-assigned WWPN on the fibre channel switch, wherein pausing I/O activity for the active LUNs comprises pausing I/O activity for active LUNs connected to the fibre channel switch via the third fabric-assigned WWPN, and wherein identifying a second fabric-assigned WWPN assigned to a port to which the disconnected LUNs are potentially reconnected comprises:

receiving a second indication that the first fabric-assigned WWPN and the third fabric-assigned WWPN have rejoined the fibre channel switch in response to sending a discovery command to the fibre channel switch;

generating a list of potential fabric-assigned WWPNs using the first fabric-assigned WWPN and the third fabric-assigned WWPN.

11. The apparatus of claim 10, wherein determining that the paused active LUNs are connected to the second fabric-assigned WWPN comprises:

retrieving, via the fibre channel switch, a world-wide node name (WWNN) for the first fabric-assigned WWPN and the third fabric-assigned WWPN;

determining that the retrieved WWNNs for the first fabric-assigned WWPN and the third fabric-assigned WWPN do not match connection information for the first fabric-assigned WWPN and the third fabric-assigned WWPN; and in response to determining that the retrieved WWNNs for the first fabric-assigned WWPN and the third fabric-assigned WWPN do not match connection information for the first fabric-assigned WWPN and the third fabric-assigned WWPN, requesting a reported list of LUNs from the first fabric-assigned WWPN and the third fabric-assigned WWPN.

12. The apparatus of claim 11, wherein determining that the paused active LUNs are connected to the second fabric-assigned WWPN further comprises:

filtering the paused active LUNs using the retrieved WWNNs for the first fabric-assigned WWPN and the third fabric-assigned WWPN;

matching at least one LUN from the filtered paused active LUNs to at least one LUN from one of the reported lists of LUNs; and determining, based on the matched active LUNs, the second fabric-assigned WWPN and a fourth fabric-assigned WWPN to which the paused active LUNs are connected.

13. The apparatus of claim 12, wherein updating, with the second fabric-assigned WWPN, the connection information for the paused active LUNs comprises updating, with the fourth fabric-assigned WWPN, the connection information for the paused active LUNs.

14. The apparatus of claim 8, wherein determining that the paused active LUNs are connected to the second fabric-assigned WWPN comprises:

matching a LUN from a reported list of LUNs obtained via the fibre channel switch to a LUN from the paused active LUNs; and determining that the matched LUN from the reported list of LUNs is connected to the fibre channel switch via the second WWPN.

15. A computer program product for I/O recovery for storage side cable movement in fabric-assigned world-wide port name (WWPN) fabrics, the computer program product disposed upon a computer readable medium, the computer program product comprising computer program instructions that, when executed, cause a computer to carry out the steps of:

receiving an indication that active logical unit numbers (LUNs) have been disconnected from a fibre channel switch port assigned with a first fabric-assigned WWPN;

pausing I/O activity for the active LUNs;

identifying a second fabric-assigned WWPN assigned to a port to which the disconnected LUNs are potentially reconnected;

determining that the paused active LUNs are connected to the second fabric-assigned WWPN;

updating, with the second fabric-assigned WWPN, connection information for the paused active LUNs; and resuming I/O activity for the paused active LUNs using the updated connection information.

16. The computer program product of claim 15, wherein identifying a second fabric-assigned WWPN assigned to a port to which the disconnected LUNs are potentially reconnected comprises:

receiving a second indication that the first fabric-assigned WWPN has not rejoined the fibre channel switch in response to sending a discovery command to the fibre channel switch;

obtaining a list of currently connected fabric-assigned WWPNs from the fibre channel switch; and generating a list of potential fabric-assigned WWPNs by filtering the list of currently connected fabric-assigned WWPNs based on WWPNs newly added to the fibre channel switch.

17. The computer program product of claim 15, wherein the received indication further indicates a change to a third fabric-assigned WWPN on the fibre channel switch, wherein pausing I/O activity for the active LUNs comprises pausing I/O activity for active LUNs connected to the fibre channel switch via the third fabric-assigned WWPN, and wherein identifying a second fabric-assigned WWPN assigned to a port to which the disconnected LUNs are potentially reconnected comprises:

receiving a second indication that the first fabric-assigned WWPN and the third fabric-assigned WWPN have rejoined the fibre channel switch in response to sending a discovery command to the fibre channel switch;

generating a list of potential fabric-assigned WWPNs using the first fabric-assigned WWPN and the third fabric-assigned WWPN.

18. The computer program product of claim 17, wherein determining that the paused active LUNs are connected to the second fabric-assigned WWPN comprises:

retrieving, via the fibre channel switch, a world-wide node name (WWNN) for the first fabric-assigned WWPN and the third fabric-assigned WWPN;

determining that the retrieved WWNNs for the first fabric-assigned WWPN and the third fabric-assigned WWPN do not match connection information for the first fabric-assigned WWPN and the third fabric-assigned WWPN; and in response to determining that the retrieved WWNNs for the first fabric-assigned WWPN and the third fabric-assigned WWPN do not match connection information for the first fabric-assigned WWPN and the third fabric-assigned WWPN, requesting a reported list of LUNs from the first fabric-assigned WWPN and the third fabric-assigned WWPN.

19. The computer program product of claim 18, wherein determining that the paused active LUNs are connected to the second fabric-assigned WWPN further comprises:

filtering the paused active LUNs using the retrieved WWNNs for the first fabric-assigned WWPN and the third fabric-assigned WWPN;

matching at least one LUN from the filtered paused active LUNs to at least one LUN from one of the reported lists of LUNs; and determining, based on the matched active LUNs, the second fabric-assigned WWPN and a fourth fabric-assigned WWPN to which the paused active LUNs are connected.

20. The computer program product of claim 19, wherein updating, with the second fabric-assigned WWPN, the connection information for the paused active LUNs comprises updating, with the fourth fabric-assigned WWPN, the connection information for the paused active LUNs.

* * * * *